United States Patent [19]

Denison

[11] Patent Number: 4,653,136

[45] Date of Patent: Mar. 31, 1987

[54] WIPER FOR REAR VIEW MIRROR

[76] Inventor: James W. Denison, 3697 Mayflower, Memphis, Tenn. 38122

[21] Appl. No.: 747,244

[22] Filed: Jun. 21, 1985

[51] Int. Cl.[4] ........................... B60G 1/08; B60G 1/44
[52] U.S. Cl. ................................ 15/250 B; 15/250.29; 15/250.35
[58] Field of Search ............ 15/250 A, 250 B, 250.29, 15/250.3, 250.35; 350/582

[56] References Cited

U.S. PATENT DOCUMENTS

| | | | |
|---|---|---|---|
| 3,866,258 | 2/1975 | DeGraw | 15/250 B |
| 4,212,091 | 7/1980 | Jones | 15/250.29 |
| 4,527,301 | 7/1985 | Seitz | 15/250 B |

Primary Examiner—Peter Feldman
Attorney, Agent, or Firm—B. P. Fishburne, Jr.

[57] ABSTRACT

A wiper for a rear view mirror includes a vertical wiper blade which traverses the mirror from side-to-side on a horizontal linear path. The wiper blade is carried on a spring-urged extension of a drive arm which is shaped to reach around one vertical edge of the mirror. The drive arm is powered by a highly simplified lightweight drive mechanism at the rear of the mirror held on a support bracket which embraces the sides of the mirror and is suspended from the top of the mirror through a sturdy top mounting bolt connected with the main mirror support bracket.

7 Claims, 3 Drawing Figures

WIPER FOR REAR VIEW MIRROR

BACKGROUND OF THE INVENTION

Wipers for large outside rear view mirrors of the types used on trucks and buses are known in the prior art. Most of the prior art wiper mechanisms are rather complex and costly, in some cases involving chain drives, precision gearing and linear motion ball bearings. Because of excessive manufacturing cost, the prior art rear view mirror wipers have not been widely adopted and are not considered as being practical from an economic point of view.

Accordingly, the object of the present invention is to provide a wiper for rear view mirrors of the above-noted type which is entirely practical and cost effective, quite simplified and efficient in its operation.

A further object of the invention is to provide a rear view mirror wiper which is powered by a very lightweight, low powered electric motor which operates a simplified drive linkage including an arm which reaches around one vertical edge of the mirror to operate a vertical wiper blade which traverses the mirror on a horizontal linear path between its vertical sides.

A further object of the invention is to provide a rear view mirror wiper which is supported by bracket means suspended from the top mounting bolt which connects the mirror to a main support frame fastened to the vehicle, thereby relieving the mirror from directly supporting the weight of the wiper attachment.

Other features and advantages of the invention will become apparent to those skilled in the art during the course of the following detailed description.

DETAILED DESCRIPTION

Figure 1:
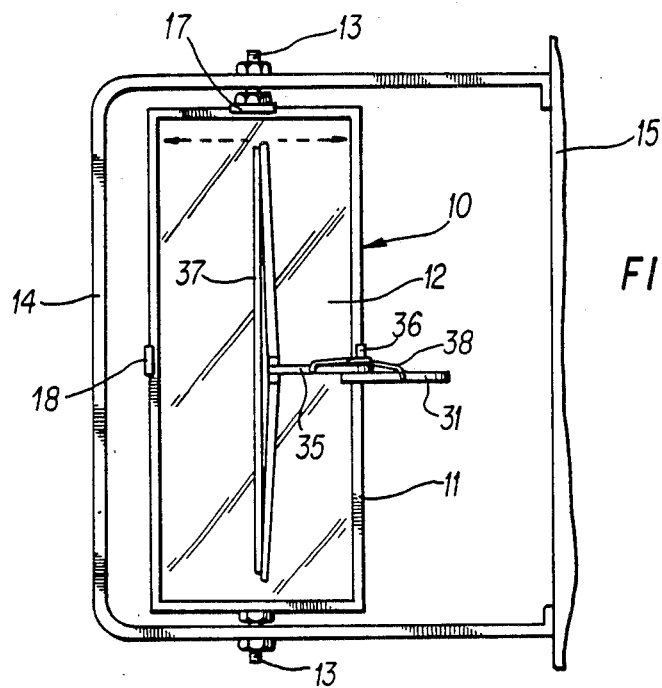
FIG. 1 is a front elevation of a rear view mirror equipped with a wiper according to the present invention as viewed from a vehicle window.
Figure 2:
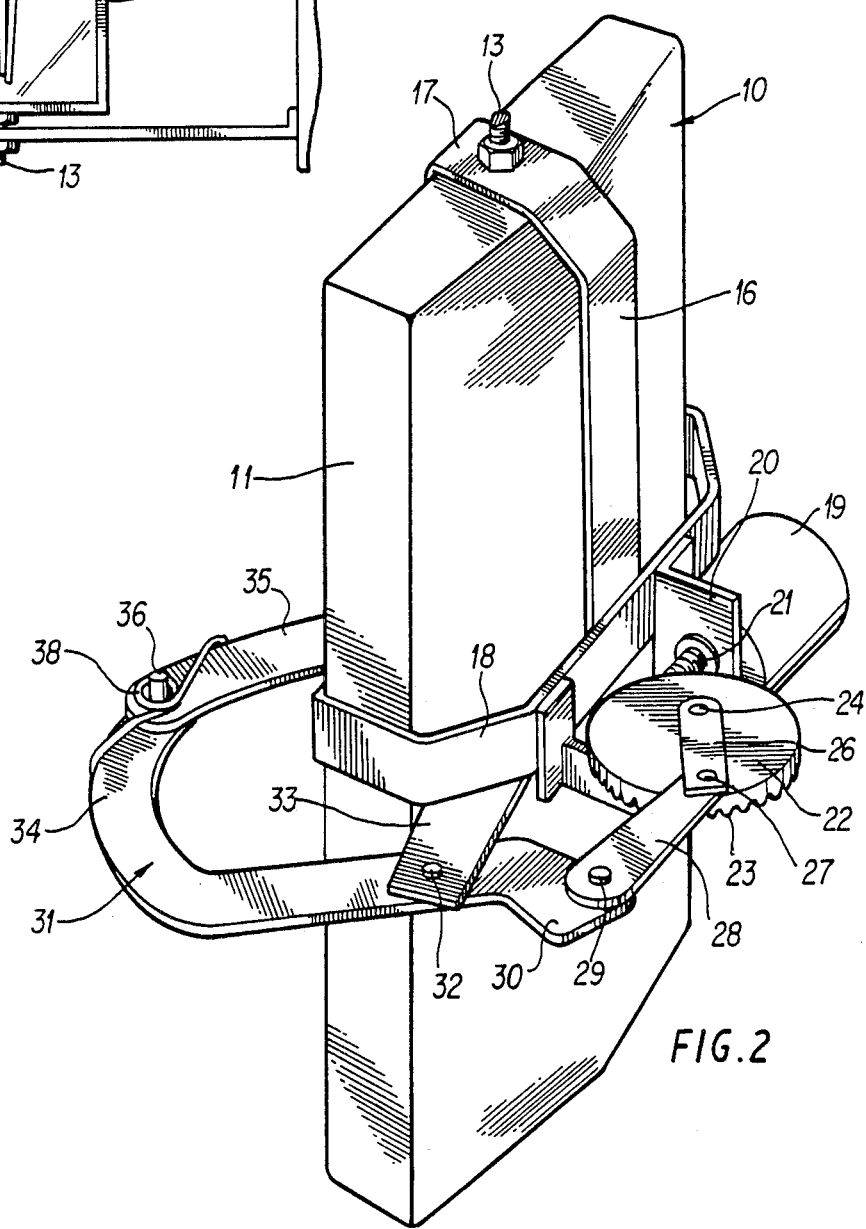
FIG. 2 is an enlarged perpsective view of the mirror and the wiper looking from the rear thereof.

As used herein, the terms "front" and "rear" refer to the reflective face and rear side of the mirror. These terms are the opposite of the front and rear of the vehicle, such as a truck, on which the mirror and wiper are installed.

Referring to the drawings in detail, wherein like numerals designate like parts, a side rear view mirror 10 of the type used on trucks, buses, large recreational vehicles and the like comprises a rectangular vertically elongated frame or holder 11 for a reflective panel 12 of the mirror. The mirror 10 is supported at its top and bottom through a pair of coaxial vertical support bolts 13 which are adjustably connected with the top and bottom arms of a main support bracket 14 for the mirror which is conventionally secured to a side portion 15 of the vehicle.

A mirror wiper attachment according to the present invention comprises a vertical suspension arm 16 at the rear of the mirror holder 11 and at its transverse center. The suspension arm 16 has a top horizontal portion 17 hooked over the top of the mirror frame or holder 11 and being apertured to receive the upper bolt 13, whereby the weight of the wiper attachment is transmitted to the main support bracket 14 rather than being entirely borne by the mirror 10.

Near the vertical center of the mirror 10, a horizontal transverse mounting bracket 18 embraces the two vertical sides of the mirror holder 11 and is attached securely to the lower end of the suspension arm 16.

A very lightweight low powered horizontal transverse axis electric motor 19 is held on a support bracket 20 attached to the rear of mounting bracket 18. This motor at proper times powers a worm gear 21 or the like, operatively engaged with a vertical axis gear 22 having gear teeth 23 on its lower side. The gear 22 is rotatable on a vertical shaft 24 supported on an extension 25 of the bracket 20.

Figure 3:
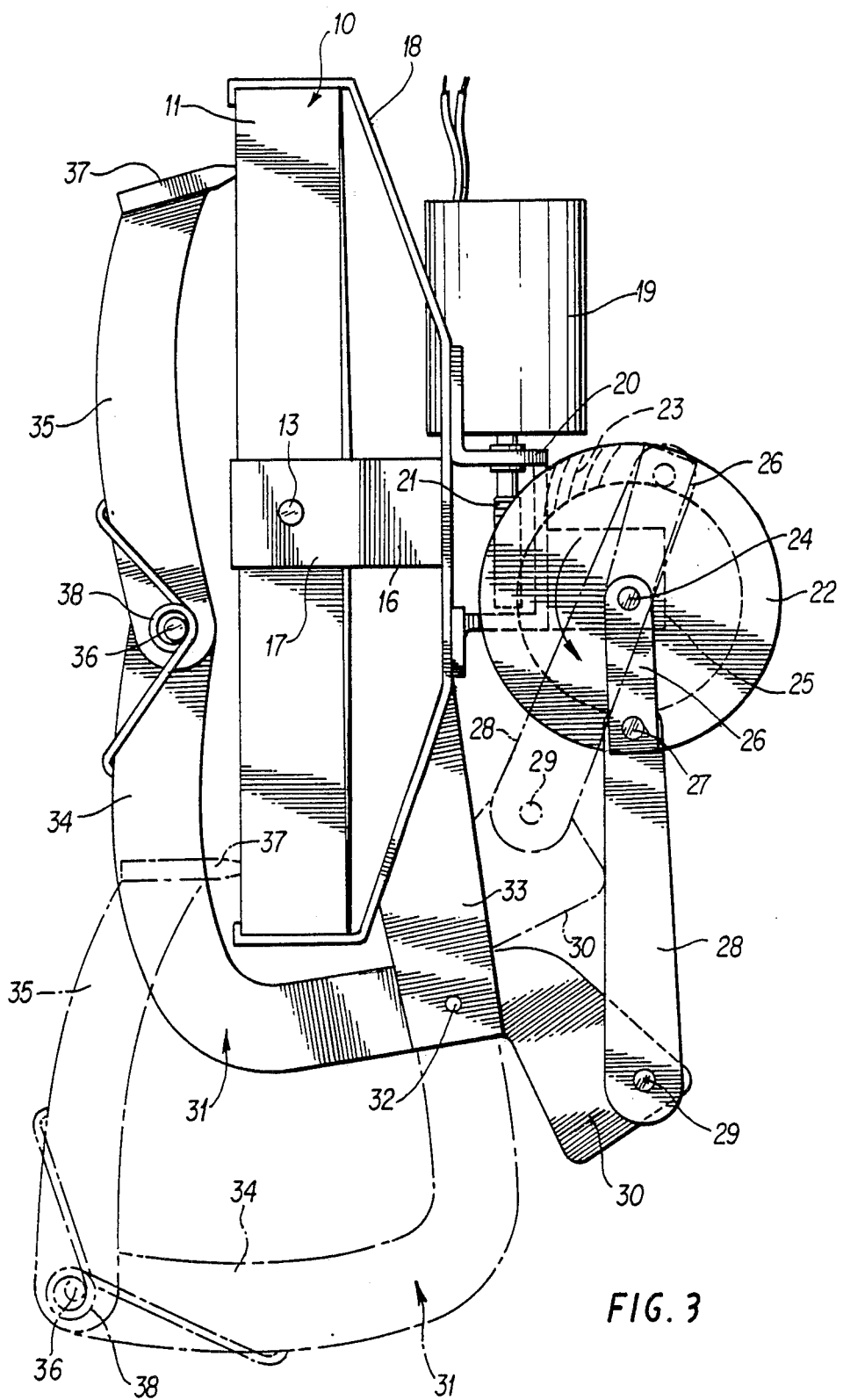
FIG. 3 is a plan view of the mirror and wiper according to the invention.

A radial drive link 26 is connected by a pin 27 to the gear 22 near the periphery of the gear and the drive link 26 revolves around the axis of the shaft 24 in the direction of the arrow shown in FIG. 3. A longer connecting link 28 is pivotally attached to the pin 27 at one end and is pivotally attached at its other end to a pin 29 which is also pivotally connected to a short lever extension 30 of a reach-around drive arm 31 disposed at one side of the mirror 10. The drive arm 31 is pivotally connected to another pin 32 with a horizontal extension 33 of the mounting bracket 18. The pivot pin 32 is close to the short lever arm 30. The drive arm 31 is configured to reach or extend around the adjacent vertical edge of the mirror 10 and across the front of the mirror in a horizontal plane. The reach-around drive arm 31 is somewhat L-shaped with the short lever extension 30 extending laterally from one arm of the L-shaped drive arm 31. The entire drive arm 31 pivots on the axis of the pin 32 in a horizontal plane during the operation of the mechanism.

The forward extension 34 of the reach-around drive arm 31 carries at its leading end a wiper blade arm extension 35 pivoted thereto by a pin 36. A wiper blade 37 is secured to the leading end of the arm extension 35. A torsion spring 38 engaged with the pin 36 biases the wiper blade 37 into firm contact at all times with the reflective panel 12 of the rear view mirror.

The wiper blade 37, FIG. 1, extends vertically for most of the height of the mirror 10 and during operation reciprocates horizontally across substantially the full width of the mirror on a linear path of movement. The electric motor 19 is controlled by a convenient on-off switch, not shown, in the cab of the vehicle. Since the wiper is used only occasionally for brief intervals, it can be operated by a very lightweight low powered inexpensive electric motor. The reduction gearing 21–22 allows the drive arm 31 and associated linkage elements to be operated with minimal effort, thus rendering the entire wiper mechanism comparatively inexpensive compared to prior art devices.

As best shown in FIG. 3, rotation of the gear 22 and radial drive link 26 around the shaft 24 causes the connecting link 28 to oscillate and reciprocate so as to turn the reach-around drive link 31 through the required stroke on the pivot pin 32, causing the wiper blade arm extension 35 and wiper blade 37 to reciprocate horizontally across the mirror panel 12 while maintaining contact therewith due to the biasing action of the spring 38. In its extended position near one side of the mirror 10, the arm extension 35 extends longitudinally beyond the portion 34 of reach-around arm 31. In its other extreme of movement shown in broken lines in FIG. 3, the arm extension 35 is substantially perpendicular to the portion 34 of the drive arm 31 and the portion 34 is spaced outwardly from one vertical side of the mirror. The same portion 34 extends across the front of the mirror with the arm extension 35, FIG. 3, when the wiper blade 37 is near the far side of the mirror.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A wiper for a rear view mirror having a mirror body portion held adjustably in a main support bracket, the improvement comprising a suspension arm at the rear of the mirror body portion and being attached at its top to a bolt connected between the mirror body portion and main support bracket, a horizontal mounting bracket secured to the suspension arm at the rear of the mirror body portion and embracing the opposite vertical edges of the body portion, a generally L-shaped reach-around drive arm pivoted to the mounting bracket near one vertical edge of the body portion and having a rear short lever extension and a forward extension adapted to reach across the front of the mirror body portion in one operative position of said drive arm, the drive arm being swingable in a horizontal plane on its pivot axis, a wiper blade arm extension including a wiper blade pivoted to the leading end of said forward extension of the reach-around drive arm, spring means biasing said wiper blade arm extension and wiper blade toward the front of the mirror body portion, and drive means for said pivoted drive arm including a horizontally movable link connected to the rear short lever extension of the drive arm and being supported on the horizontal mounting bracket.

2. A wiper for a rear view mirror as defined in claim 1, and said drive means further including a drive motor on said mounting bracket, gearing including a vertical axis gear driven by said drive motor, and a radial drive link on said gear and turning therewith and being pivotally connected with the horizontally movable link.

3. A wiper for a rear view mirror as defined in claim 2, and the drive motor comprising a horizontal transverse axis electric motor near the rear of the mirror body portion, said gearing including a small diameter gear on the drive shaft of said motor, said vertical axis gear being a larger diameter gear meshing with said small diameter gear.

4. A wiper for a rear view mirror as defined in claim 1, and said mounting bracket having a horizontal extension projecting beyond one vertical edge of the mirror body portion near the rear of the body portion to which said reach-around drive arm is pivotally connected on a vertical axis pivot element disposed near and forwardly of said short lever extension of the reach-around drive arm.

5. A rear view mirror and wiper assembly comprising a rectangular mirror body portion, a main support bracket for the mirror body portion including vertical axis mounting bolt means connected between the top and bottom of the mirror body portion and top and bottom arms of the main mounting bracket, a substantially vertical suspension arm at the rear of the mirror body portion and being connected with the vertical axis bolt means at the top of said body portion, a horizontal transverse mounting bracket secured to the lower end of said vertical suspension arm adjacent to the rear of the mirror body portion near its vertical center, a horizontal extension carried by said mounting bracket and projecting beyond one vertical side of the mirror body portion, a horizontally swingable reach-around drive arm pivotally secured to said horizontal extension and having a short rear lever arm and a forward extension adapted to extend partly across the front of the mirror body portion, a wiper blade carrying horizontal arm extension pivotally secured to the leading end of said forward extension of the reach-around drive arm and being resiliently biased toward the front of the mirror body portion, said wiper blade horizontal arm extension adapted in one operative position of the reach-around drive arm to extend near the vertical side of the mirror body portion which is distant from said horizontal extension carried by the mounting bracket, and power drive means for said reach-around drive arm on said horizontal transverse mounting bracket adjacent to the rear of the mirror body portion, said power drive means being operatively connected with said short rear lever arm of the reach-around drive arm.

6. A rear view mirror and wiper assembly as defined in claim 5, and the power drive means including a rotary eccentric means, and a connecting link between the eccentric means and said short rear lever arm.

7. A rear view mirror and wiper assembly comprising an upright mirror body portion, a mounting bracket means attached to the mirror body portion at the rear thereof and including a horizontal extension near one side of the mirror body portion, a reach-around wiper blade drive arm pivotally attached to said extension on a vertical axis pivot and being swingable in a horizontal plane relative to the mirror body portion and including a rear short lever arm projecting rearwardly of said extension, a wiper blade arm pivotally attached to the reach-around wiper blade drive arm adjacent to the front of the mirror body portion and including a vertical wiper blade spanning a major portion of the height of the mirror body portion, a spring connected with the wiper blade arm and biasing it in a direction causing the wiper blade to wipingly engage the front of the mirror body portion, and power drive means for the reach-around wiper blade drive arm on the mounting bracket means including a link connected with said rear short lever extension, whereby the reach-around wiper blade drive arm is oscillated on said vertical axis pivot and the wiper blade is caused to traverse the front of the mirror body portion on a horizontal linear path of movement.

* * * * *